Nov. 15, 1949 — O. E. BECKER — 2,488,159
FLEXIBLE STEERING WHEEL
Filed Dec. 14, 1946 — 2 Sheets-Sheet 1
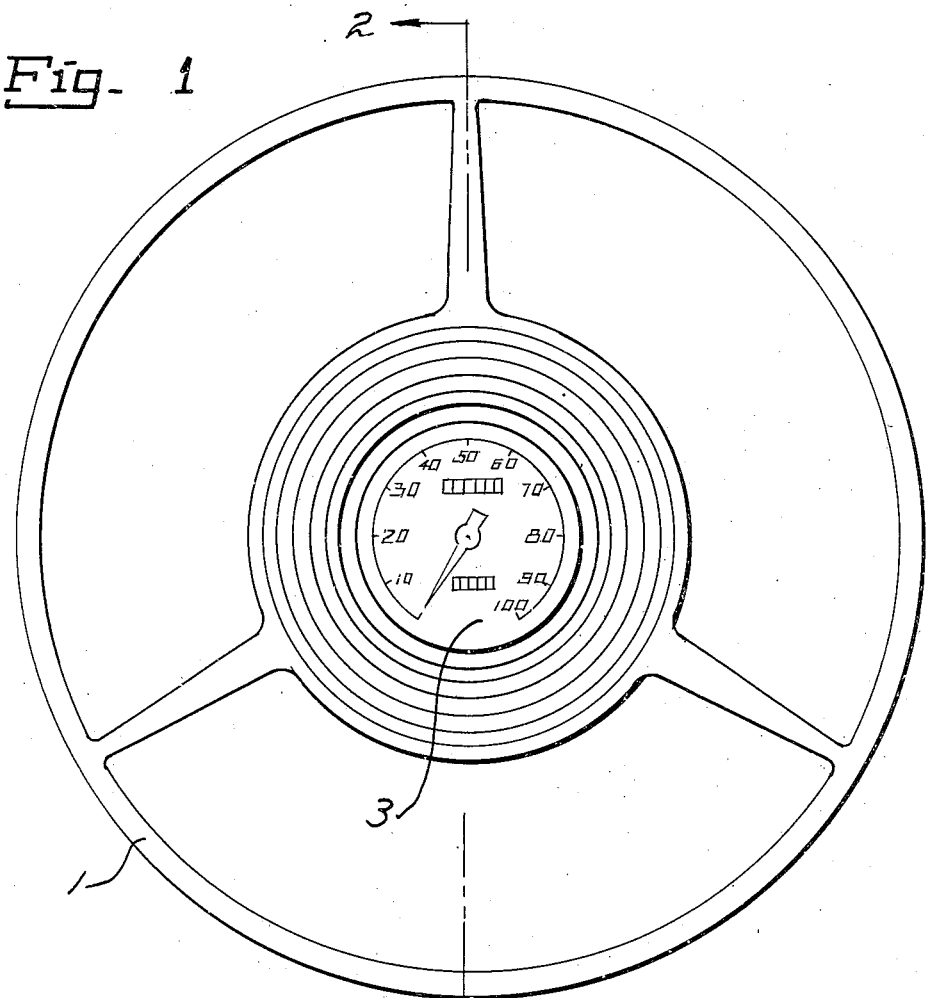
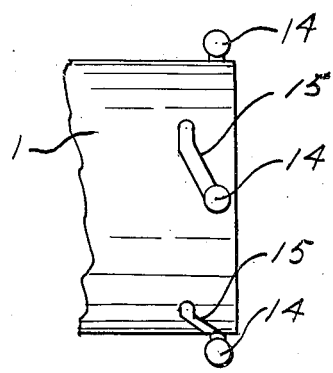
INVENTOR.
Otto Edward Becker

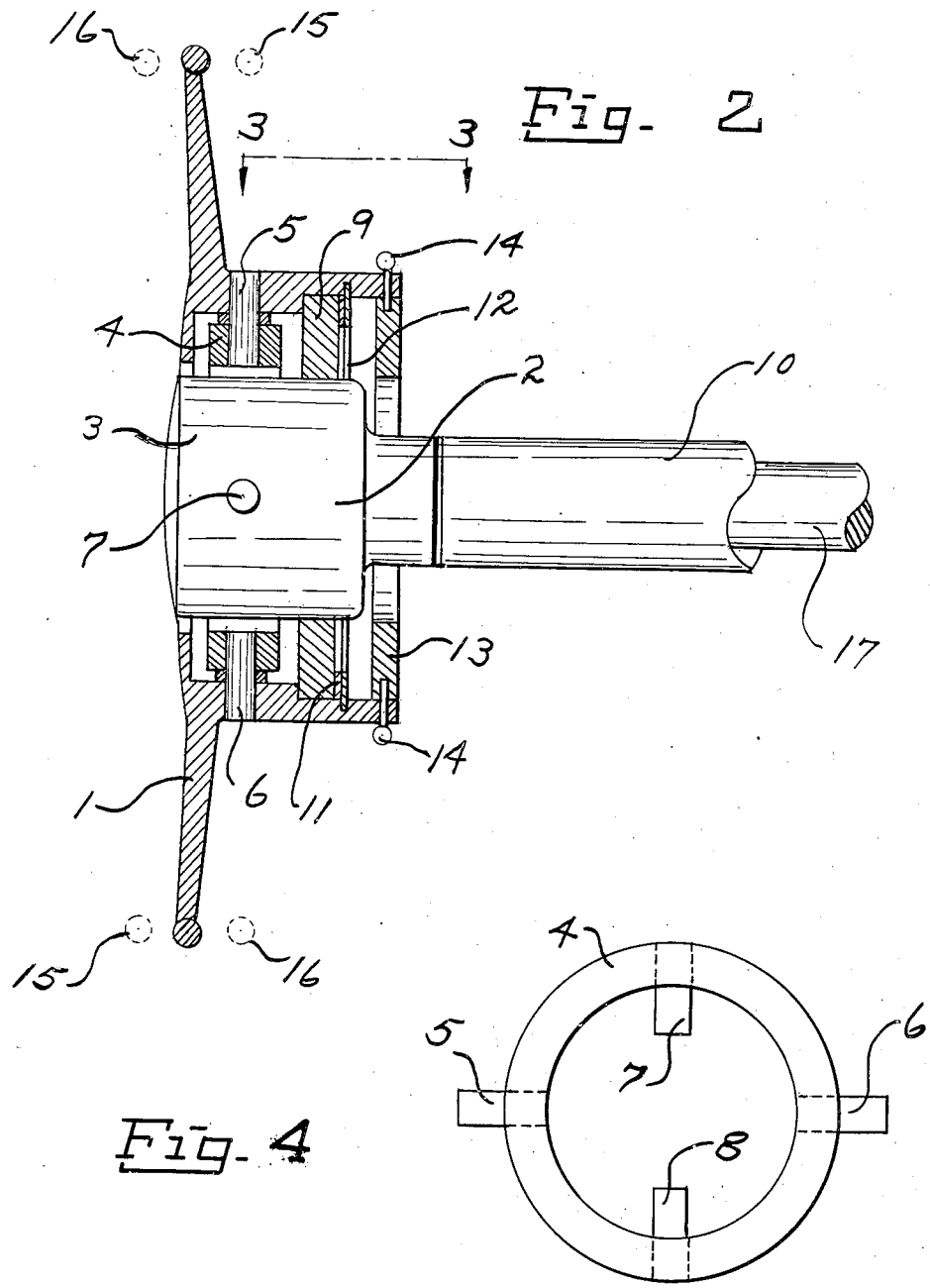

Patented Nov. 15, 1949

2,488,159

UNITED STATES PATENT OFFICE 2,488,159

FLEXIBLE STEERING WHEEL

Otto Edward Becker, Los Angeles, Calif.

Application December 14, 1946, Serial No. 716,231

1 Claim. (Cl. 74—552)

This invention relates to steering wheels that are movable, within limits, at right angles to their normal angular movement, without affecting the last mentioned movement. I have shown this steering wheel built around a speedometer which is fully explained in my United States Patent No. 2,094,651 of October 5, 1937.

The primary object of my invention is to obviate in a large degree the human fatigue usually experienced in driving an automobile or other vehicle.

A further object of the invention is to provide a steering wheel that is free to conform to the optimum angle for the individual driving.

A further object of the invention is to provide a steering wheel that will readily yield to permit the driver to get in and out from behind the wheel with ease.

A further object of the invention is to provide a steering wheel that will minimize and obviate the road shocks usually transmitted to the wheel.

A further object of the invention is to provide a steering wheel wherein the driver may move his hands and arms without releasing his grip on the rim and without changing the course of the car.

With these and incidental objects in view, the invention consists in certain novel features of construction and combination of parts, a preferred form of which is hereinafter shown with reference to the drawings which accompany and form a part of this specification.

In the drawings:

Fig. 1 is a plan view of the steering wheel.

Fig. 2 is a cross sectional view of the wheel taken on line 2—2, Fig. 1 looking in the direction indicated.

Fig. 3 is a fragmentary view taken at 3—3, Fig. 2 looking in the direction indicated.

Fig. 4 is a plan view of the gimbal ring removed from the assembly.

Like numerals refer to like parts throughout the several views.

My invention shows the steering wheel 1 disposed about the hub 2, which contains the speedometer 3. The gimbal ring 4 interposes the steering wheel 1 and hub 2 and is secured to the wheel by the trunnion pins 5 and 6; and to the hub by the trunnion pins 7 and 8. The soft rubber ring 9 holds the wheel 1 normal to the mast jacket 10 when it is free and it is held in place by the washer 11 and the snap ring 12. I provide the lock ring 13 which is placed in the lower end of the wheel and is held in place by the pins 14, which operate in the bayonet slots 15. Since the wheel 1 is mounted on the gimbal ring 4, it is obvious that it may be moved at right angles to the mast jacket 10 at any point on the rim. This occurs without affecting the angular motion of the hub 2, thus permitting arm movement without moving the steering post. While I show soft rubber for holding the wheel normal, any light spring will prove suitable. If it is desired to make the wheel rigid, the lock ring 13 is rotated through the pins 14, this causes the ring to move upwardly displacing the space between the lower end of the wheel 1 and the hub 2 making the gimbal ring 4 ineffective. The dotted positions of the wheel rim 15 and 16 show the maximum position to which it may be moved. The steering post is indicated at 17.

While the form of mechanism herein shown and described is admirably adapted to fulfill the objects primarily stated, it is to be understood that it is not intended to confine the invention to the one form of embodiment herein shown and described as it is susceptible of embodiment in various forms, all coming within the scope of the claim which follows.

What I claim is:

A steering wheel having an independent hub, a wheel disposed about said hub, a gimbal ring interconnecting said hub and wheel and a movable lock ring for locking said wheel against movement relative to said hub.

OTTO EDWARD BECKER.

REFERENCES CITED

The following references are of record in the file of this patent:

UNITED STATES PATENTS

| Number | Name | Date |
|---|---|---|
| 488,539 | Claus | Dec. 27, 1892 |
| 1,521,132 | Sperry | Dec. 30, 1924 |
| 1,618,137 | Roebuck | Feb. 15, 1927 |
| 1,826,278 | Flanigan | Oct. 6, 1931 |

FOREIGN PATENTS

| Number | Country | Date |
|---|---|---|
| 559,377 | France | Sept. 14, 1923 |
| 612,550 | France | Oct. 26, 1926 |
| 341,185 | Great Britain | Jan. 15, 1931 |